US011675200B1

(12) United States Patent
Hoover et al.

(10) Patent No.: US 11,675,200 B1
(45) Date of Patent: Jun. 13, 2023

(54) ANTENNA METHODS AND SYSTEMS FOR WEARABLE DEVICES

(71) Applicant: Google LLC, Mountain View, CA (US)

(72) Inventors: Christopher Hoover, Mountain View, CA (US); Jay Kothari, San Francisco, CA (US); Melvin Chua, Danville, CA (US); Alberto Vidal, Mountain View, CA (US); Prasad Panchalan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/556,041

(22) Filed: Dec. 20, 2021

Related U.S. Application Data

(62) Division of application No. 16/221,219, filed on Dec. 14, 2018, now abandoned.

(51) Int. Cl.
*H04W 4/02* (2018.01)
*G01S 5/00* (2006.01)
(Continued)

(52) U.S. Cl.
CPC ....... *G02B 27/0176* (2013.01); *G06F 1/1658* (2013.01); *H01Q 1/22* (2013.01); *G01B 7/003* (2013.01); *G01S 1/20* (2013.01); *G01S 1/24* (2013.01); *G01S 5/00* (2013.01); *G01S 5/0289* (2013.01); *G01S 19/49* (2013.01); *G02B 27/017* (2013.01); *G02B 2027/0178* (2013.01); *G06F 1/163* (2013.01); *G06F 1/1698* (2013.01); *G06F 3/0346* (2013.01); *H01Q 1/2291* (2013.01); *H04W 4/02* (2013.01); *H04W 4/025* (2013.01);
(Continued)

(58) Field of Classification Search
CPC .............. G02B 27/0176; G02B 27/017; G02B 2027/0178; G06F 1/1658; G06F 1/1698; G06F 1/163; G06F 3/0346; H01Q 1/22; H01Q 1/12; H01Q 1/2291; H01Q 1/243; H01Q 5/30; H04B 1/0064; H05K 5/0004; H05K 5/0217; H05K 5/0247; H05K 5/0273; G01B 7/003; G01S 1/20; G01S 1/24; G01S 5/00; G01S 5/0289; G01S 19/49; H04W 4/02; H04W 4/025; H04W 4/026; H04W 56/0065; H04W 84/12
See application file for complete search history.

(56) References Cited

U.S. PATENT DOCUMENTS

2011/0066375 A1 * 3/2011 France .................. G01C 15/00
701/469
2015/0288055 A1 10/2015 Youm et al.
(Continued)

*Primary Examiner* — Douglas M Wilson
(74) *Attorney, Agent, or Firm* — Kilpatrick Townsend & Stockton LLP

(57) ABSTRACT

Determining a relative location of an object in an environment of a head-mountable device by performing a Wi-Fi round trip time (RTT) process to determine a location of the head-mountable device based on respective round-trip times for a plurality of access points or peer devices, using data generated by an inertial measurement unit as a basis for determining a pose of the head-mountable device, determining a location of a first object in an environment of the head-mountable device, and based at least in part on the location and pose of the head mountable device and the location of the first object, determining a relative location of the first object.

18 Claims, 15 Drawing Sheets

(51) Int. Cl.
  *G01S 1/20* (2006.01)
  *G01S 1/24* (2006.01)
  *H04W 56/00* (2009.01)
  *H04W 84/12* (2009.01)
  *G01B 7/00* (2006.01)
  *G01S 5/02* (2010.01)
  *G01S 19/49* (2010.01)
  *G06F 3/0346* (2013.01)
  *G02B 27/01* (2006.01)
  *G06F 1/16* (2006.01)
  *H01Q 1/22* (2006.01)

(52) U.S. Cl.
  CPC ........ *H04W 4/026* (2013.01); *H04W 56/0065* (2013.01); *H04W 84/12* (2013.01)

(56) References Cited

U.S. PATENT DOCUMENTS

| | | |
|---|---|---|
| 2016/0018856 A1 | 1/2016 | Heo et al. |
| 2016/0056526 A1 | 2/2016 | Li et al. |
| 2016/0276757 A1 | 9/2016 | Smith et al. |
| 2016/0329628 A1 | 11/2016 | Kim et al. |
| 2017/0061692 A1* | 3/2017 | Giraldi ............... G06T 7/70 |
| 2017/0061700 A1* | 3/2017 | Urbach ............ G06F 3/04815 |
| 2017/0170562 A1 | 6/2017 | Lee et al. |
| 2018/0241115 A1 | 8/2018 | Cho et al. |
| 2018/0277934 A1 | 9/2018 | Kim et al. |
| 2019/0179426 A1* | 6/2019 | Ojala ................ G06F 3/011 |
| 2019/0252771 A1 | 8/2019 | Yong et al. |
| 2020/0027236 A1* | 1/2020 | Tamama ........... G06F 3/04815 |
| 2020/0044316 A1 | 2/2020 | Ruaro et al. |
| 2020/0052428 A1 | 2/2020 | Cho et al. |
| 2020/0065288 A1 | 2/2020 | Dai et al. |
| 2020/0076057 A1 | 3/2020 | Leutheuser et al. |
| 2020/0081091 A1* | 3/2020 | Amin ............... G01S 5/02213 |
| 2020/0227821 A1 | 7/2020 | Wu et al. |
| 2020/0287275 A1 | 9/2020 | Son et al. |
| 2020/0381807 A1 | 12/2020 | Park |
| 2021/0141448 A1* | 5/2021 | Woods ............... G01B 7/30 |

\* cited by examiner

ANTENNA METHODS AND SYSTEMS FOR WEARABLE DEVICES

CROSS-REFERENCE TO RELATED APPLICATIONS

The present application is a divisional of U.S. patent application Ser. No. 16/221,219, filed on Dec. 14, 2018, the disclosure of which is incorporated herein by reference.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

In one aspect, a system includes a first housing portion and a second housing portion. The first housing portion comprises a pair of spring clips mounted to a PCB, and radio controller hardware coupled to the pair of spring clips. The second housing portion is configured to couple to the first housing portion, and comprises a first antenna, wherein the antenna has two contacts, wherein each contact is configured to couple to a respective one of the pair of spring clips when the first housing portion and the second housing portion are coupled together.

In another aspect, a system includes radio controller hardware coupled to a first PCB; a first antenna mounted on a rigid flex, where the antenna is coupled to the PCB in a manner to send and receive radio signal from the radio controller; and a data port coupled to the PCB.

In a further aspect, a method is performed by a head-mountable device with a Wi-Fi chipset and an inertial measurement unit and involves: (i) transmitting packets to and from a plurality of access points or peer devices; based on the transmitted and received packets, (ii) determining a respective round-trip time corresponding to each access point or peer device, (iii) performing a Wi-Fi round trip time (RTT) process to determine a location of the head-mountable device based on the respective round-trip times for the plurality of access points or peer devices, (iv) using data generated by the inertial measurement unit as a basis for determining a pose of the head-mountable device, (v) determining a location of a first object in an environment of the head-mountable device; and (vi) based at least in part on (a) the location and pose of the head mountable device, and (b) the location of the first object, determining a relative location of the first object.

In yet another aspect, a head-mountable device includes a Wi-Fi chipset operable for wireless data communications, an inertial measurement unit, a processor, and a non-transitory computer-readable medium comprising program instructions. The program instructions are executable by the processor to: (i) use the Wi-Fi chipset to transmit and receive packets to a plurality of access points or peer devices, (ii) based on the transmitted and received packets, determine a respective round-trip time corresponding to each access point or peer device, (iii) implement a Wi-Fi round trip time (RTT) process to determine a location of the head-mountable device based on the respective round-trip times for the plurality of access points or peer devices, (iv) based on data generated by the inertial measurement unit, determine a pose of the head-mountable device, (v) determine a location of a first object in an environment of the head-mountable device, and (vi) based on (a) the location and pose of the head mountable device, and (b) the location of the first object, determine a relative location of the first object.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 1B illustrates an alternate view of the wearable computing device illustrated in

FIG. 1A.

FIGS. 3A to 3I show arrangements of antennas on wearable devices, according to example embodiments.

DETAILED DESCRIPTION

Figure 1A:
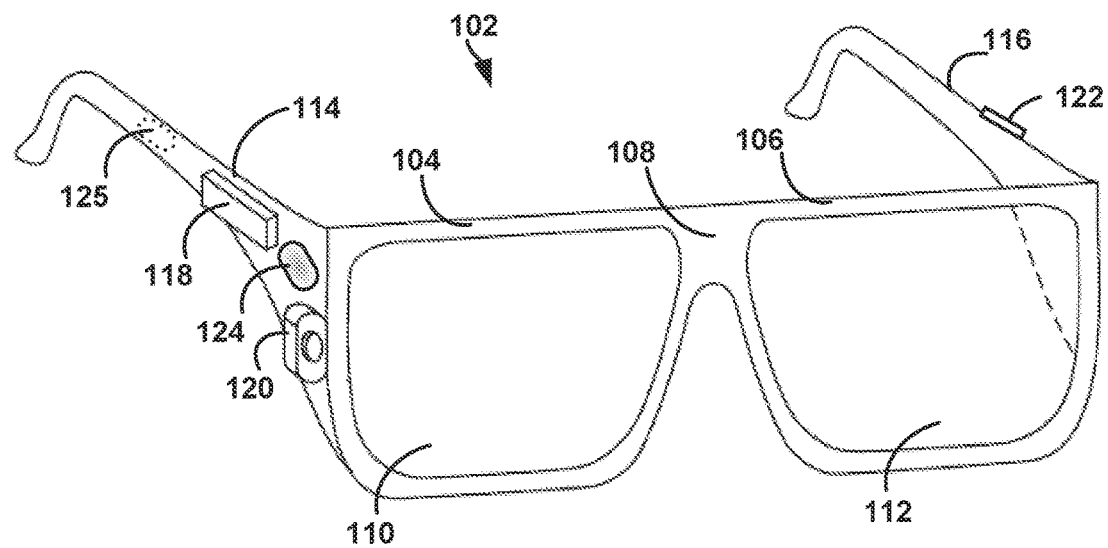
FIG. 1A illustrates an example of a wearable computing system.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

II. EXAMPLE WEARABLE COMPUTING DEVICES

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
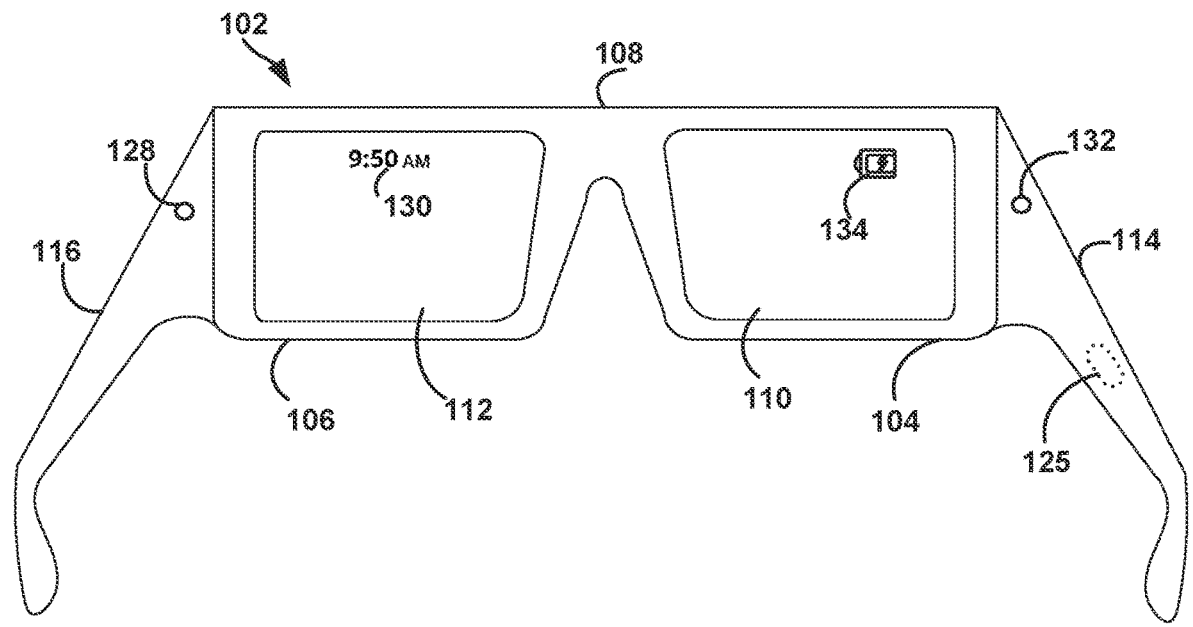

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
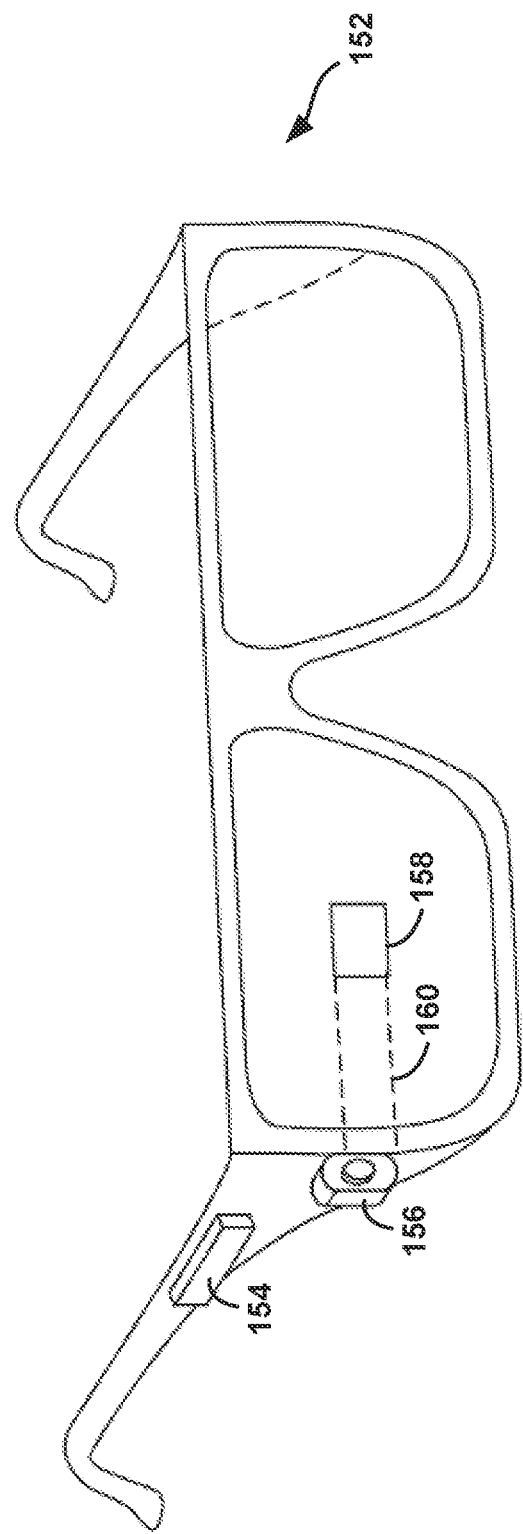
FIG. 1C illustrates another example of a wearable computing system.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well, or may be embedded into or otherwise attached to the frame.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
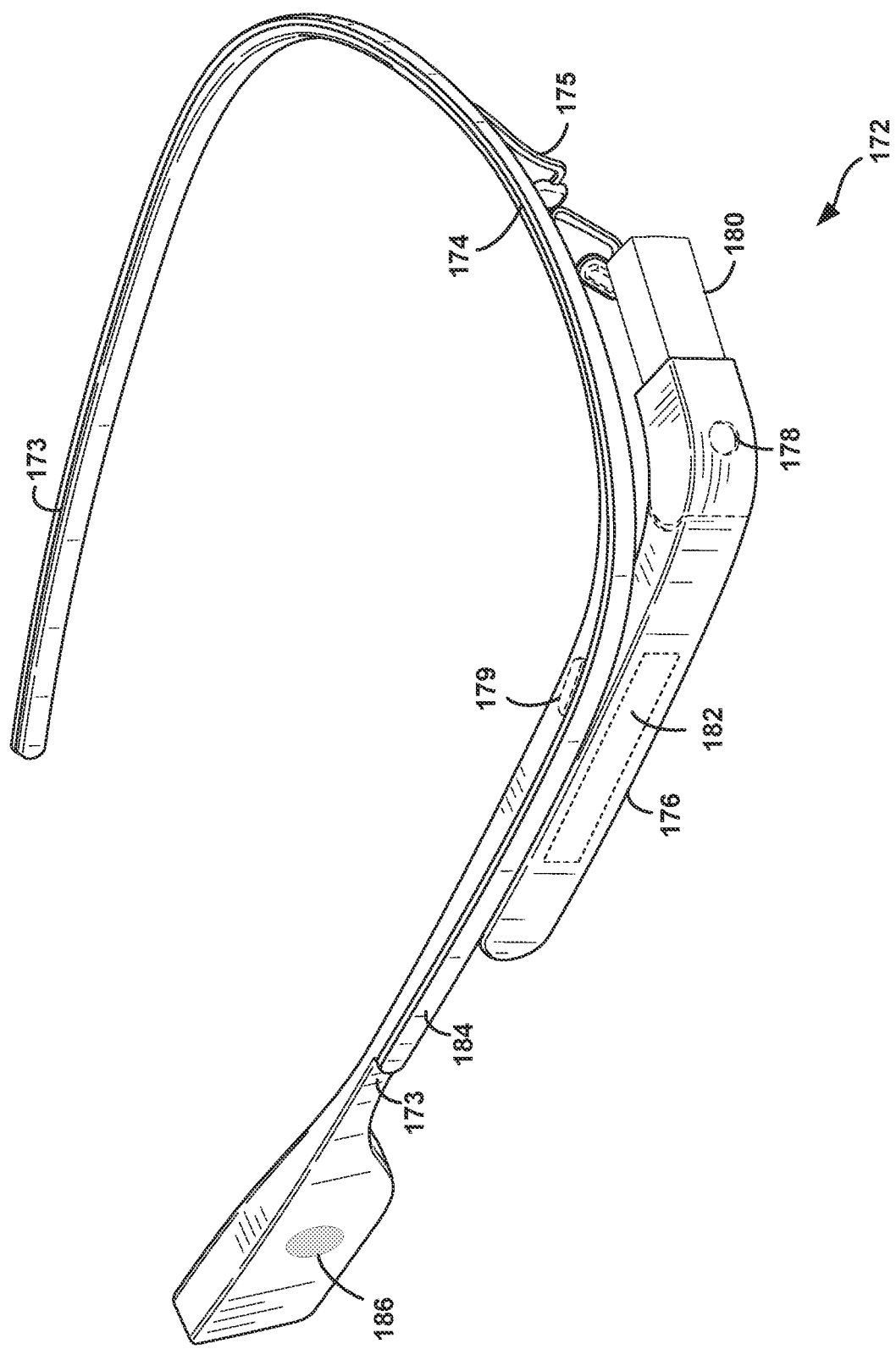
FIG. 1D illustrates another example of a wearable computing system.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. (Embodiments with a second display for the other eye are also possible.) In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
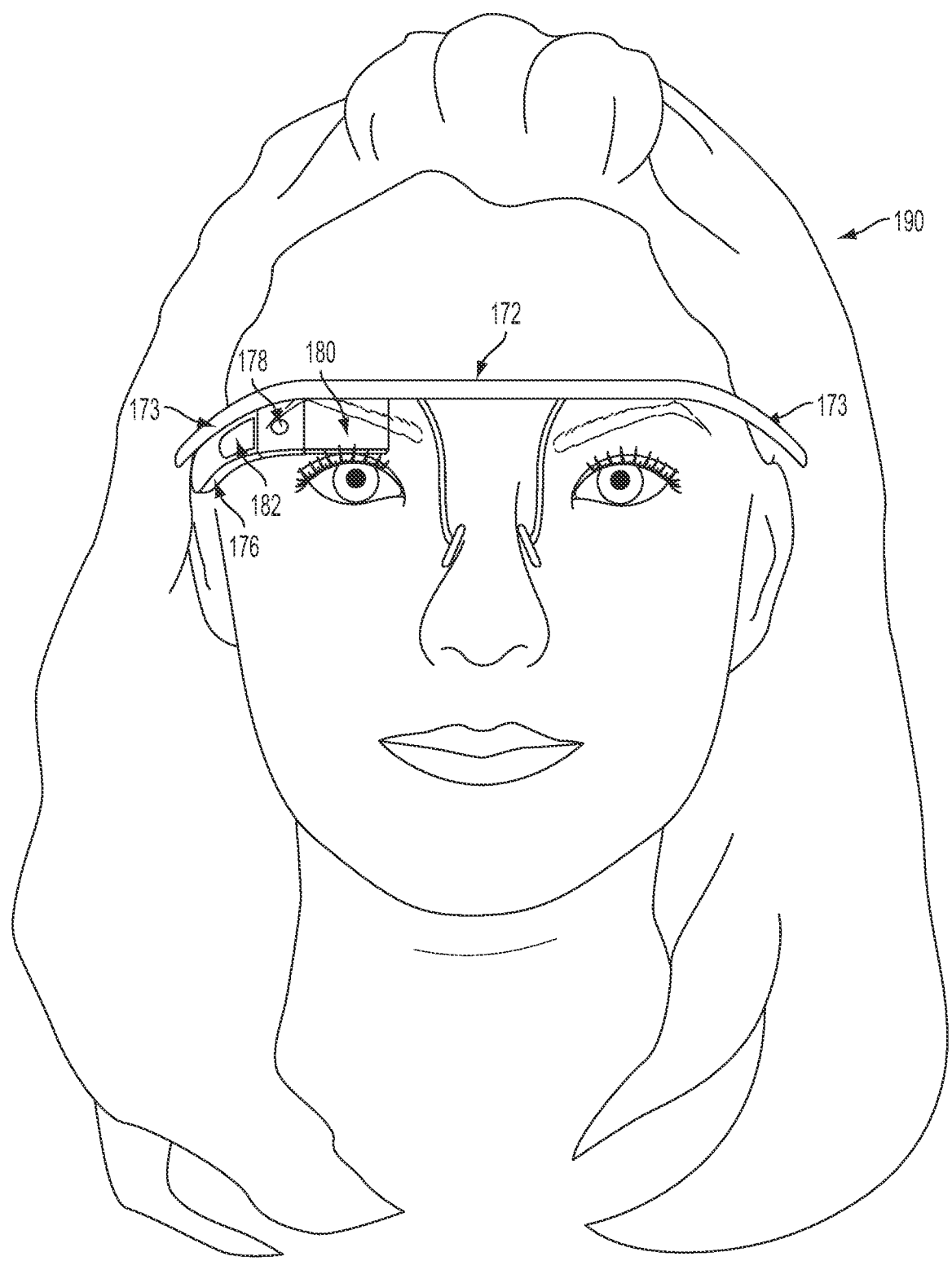
FIGS. 1E to 1G are simplified illustrations of the wearable computing system shown in FIG. 1D, being worn by a wearer.
Figure 1F:
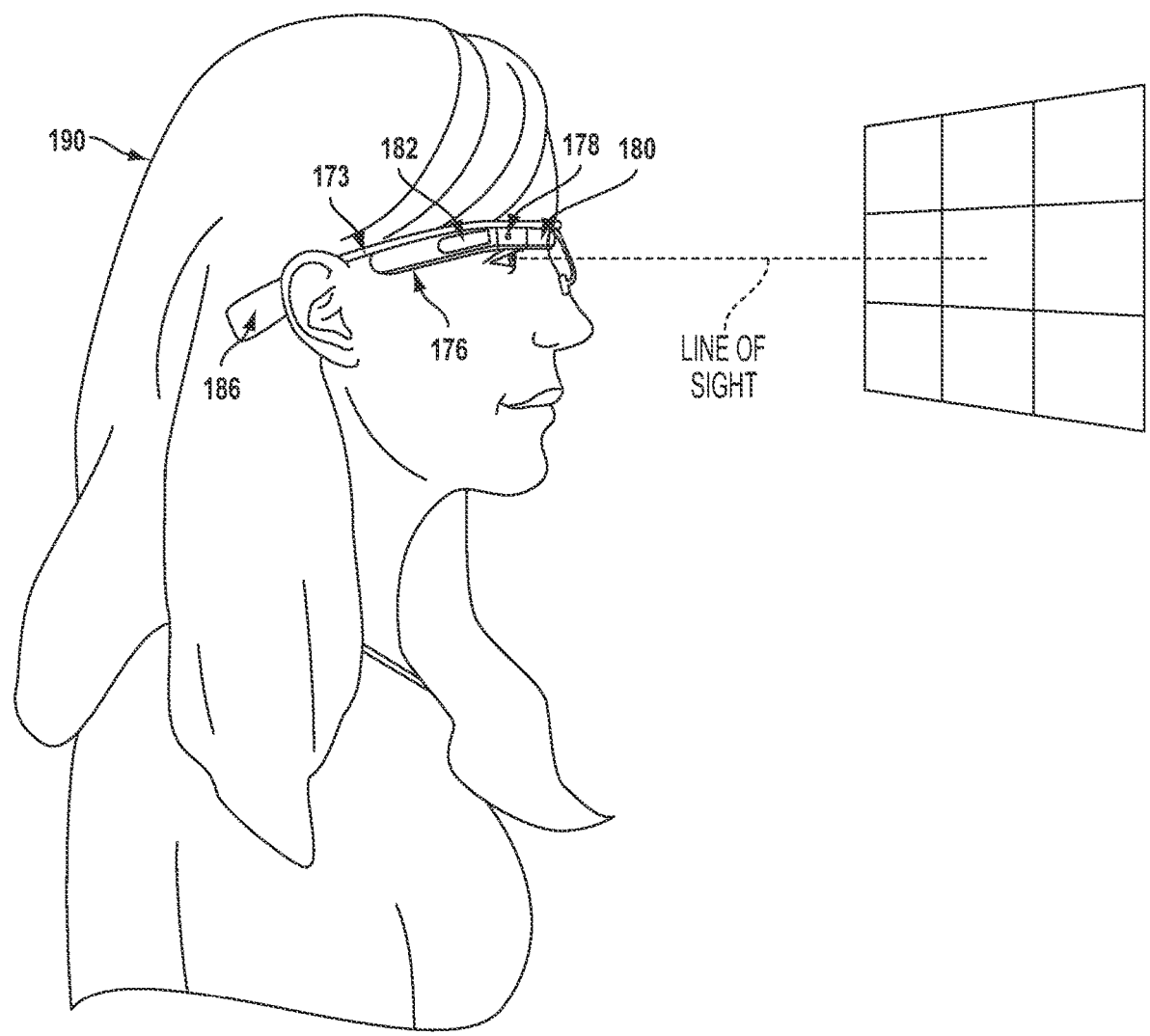
Figure 1G:
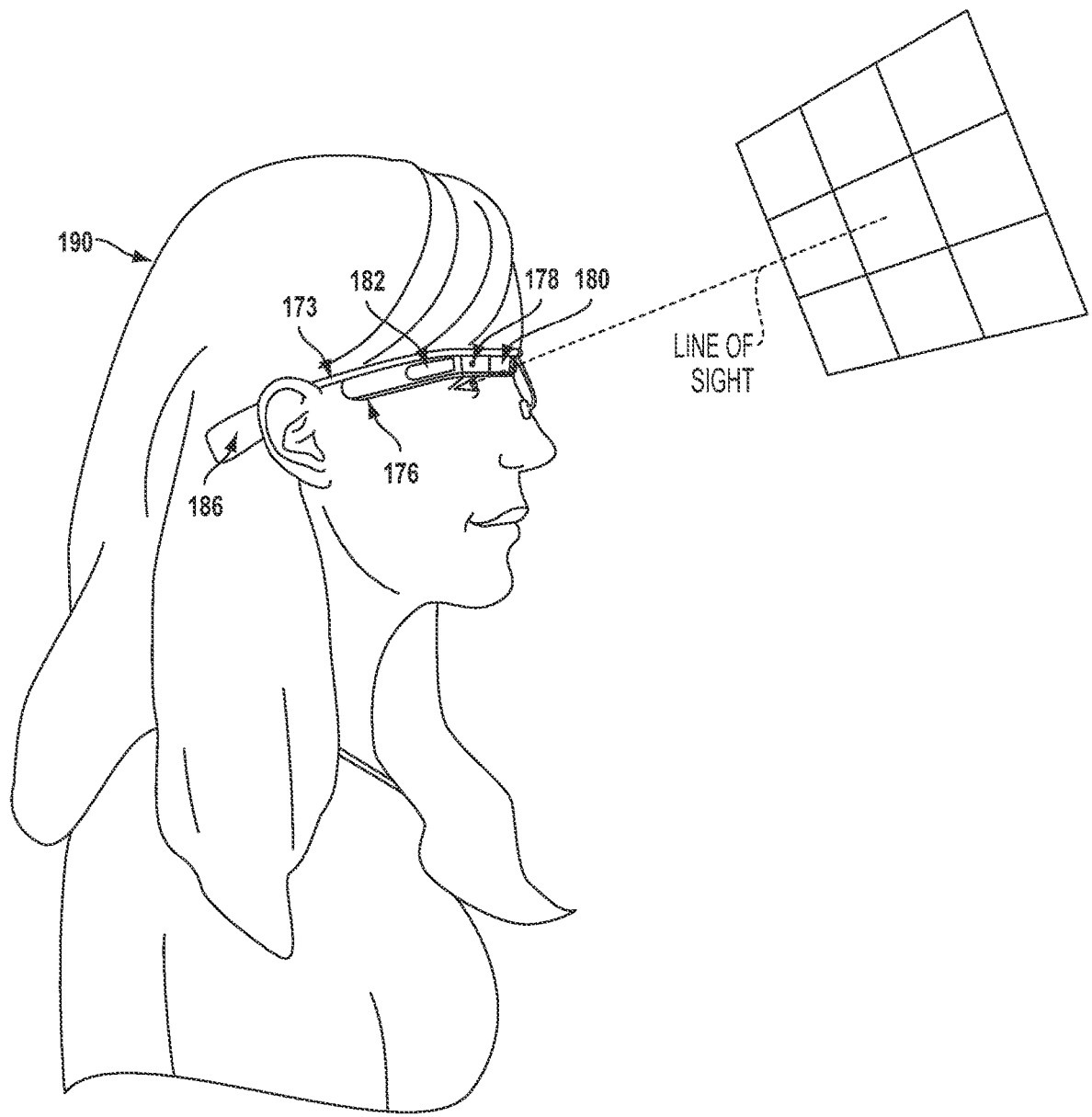

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2:
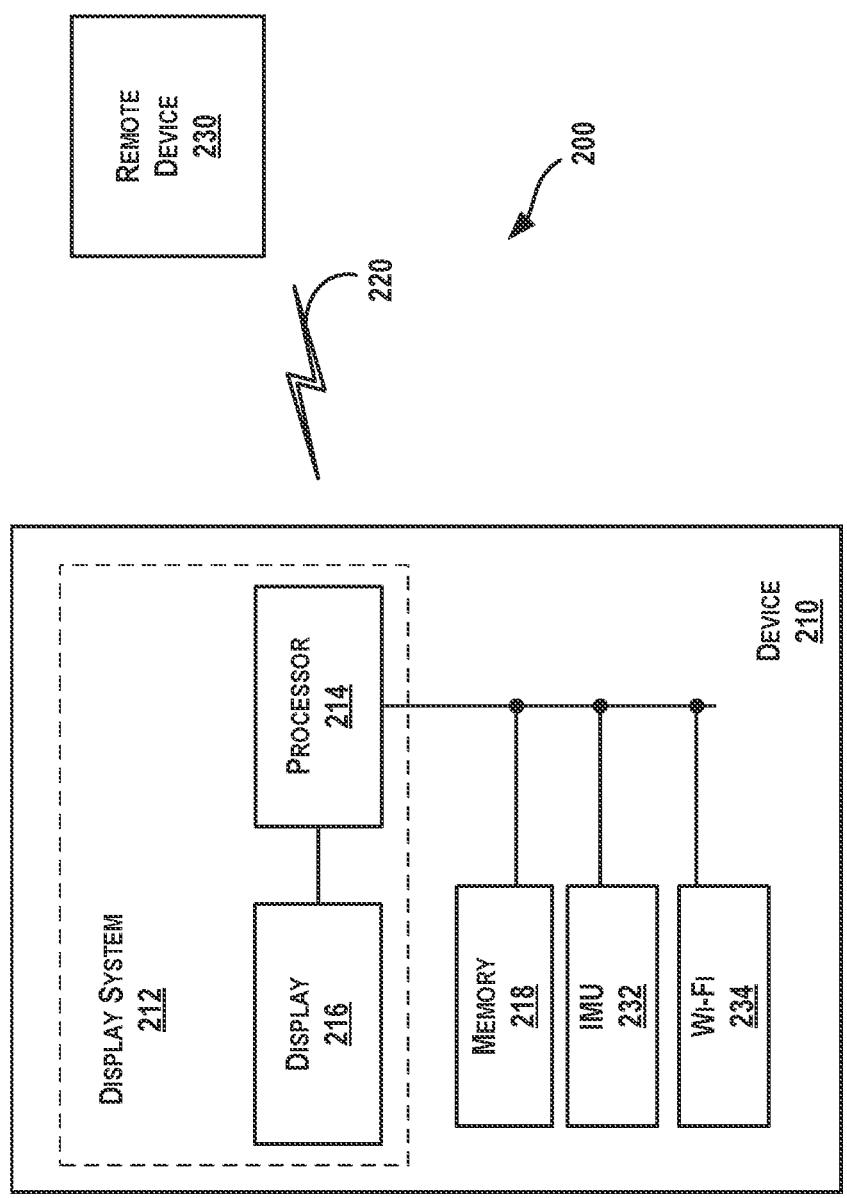
FIG. 2 is a simplified block diagram of a computing device according to example embodiments.

FIG. 2 is a simplified block diagram of a computing device 210 according to an example embodiment. The device 210 may be any type of device that can receive data and display information corresponding to or associated with the data. For example, the device 210 may take the form of or include a head-mountable display, such as the head-mounted devices 102, 152, or 172 that are described with reference to FIGS. 1A to 1G. The device 210 could also take the form of other types of wearable devices, such as watch-style (e.g., wrist-mounted) wearable device, or a clip-on device that can be attached to the body or to clothing, among other possibilities.

The device 210 may include a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

In an example embodiment, device 210 communicates using a communication link 220 (e.g., a wired or wireless connection) to a remote device 230. The remote device 230 may be any type of computing device or transmitter including a laptop computer, a mobile telephone, head-mountable display, tablet computing device, etc., that is configured to transmit data to the device 210. The remote device 230 and the device 210 may contain hardware to enable the communication link 220, such as processors, transmitters, receivers, antennas, etc.

In some embodiments, the device 210 also includes an inertial measurement unit (IMU) 232. The IMU 232 may include sensors for measuring the HMD's specific force, the HMD's angular rate of movement, and/or the magnetic field surrounding the device 210. For instance, IMU 232 could include one or more accelerometers, one or more gyroscopes, and/or one or more magnetometers. Provided with such capabilities, an IMU 232 could function as an orientation sensor for the device 210, which allows the device 210 to determine its pose or orientation (e.g., the device's angular direction within a world coordinate system or another coordinate system). In a further aspect, data from IMU 232 may provide for altitude determination, such that device 210 can determine its own height above the ground.

Device 210 also includes a Wi-Fi interface 234. The Wi-Fi interface 234 may be a Wi-Fi chipset and/or antenna that allows the device 210 to engage in wireless data communications according to an IEEE 802.11 protocol. In some embodiments, Wi-Fi interface 234 may be configured to engage in wireless data communications according to the 802.11mc standard. Further, device 210 may include program instructions that are executable to utilize the 802.11mc, and determine the device's location using Wi-Fi Round Trip Time (RTT) functionality based on the 802.11mc standard.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In some embodiments, remote device 230 may be a Wi-Fi access point configured for communications according to the 802.11mc standard. Alternatively, remote device 230 could be another type of device, such as a mobile phone, configured as a Wi-Fi Aware device. In either case, when device 210 is within range of a plurality of devices configured in this manner, device 210 could calculate respective round trip times for packets to and from each device, and use Wi-Fi RTT location determination processes to determine its own location.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

IV. ILLUSTRATIVE RF SYSTEMS

Figure 3A:
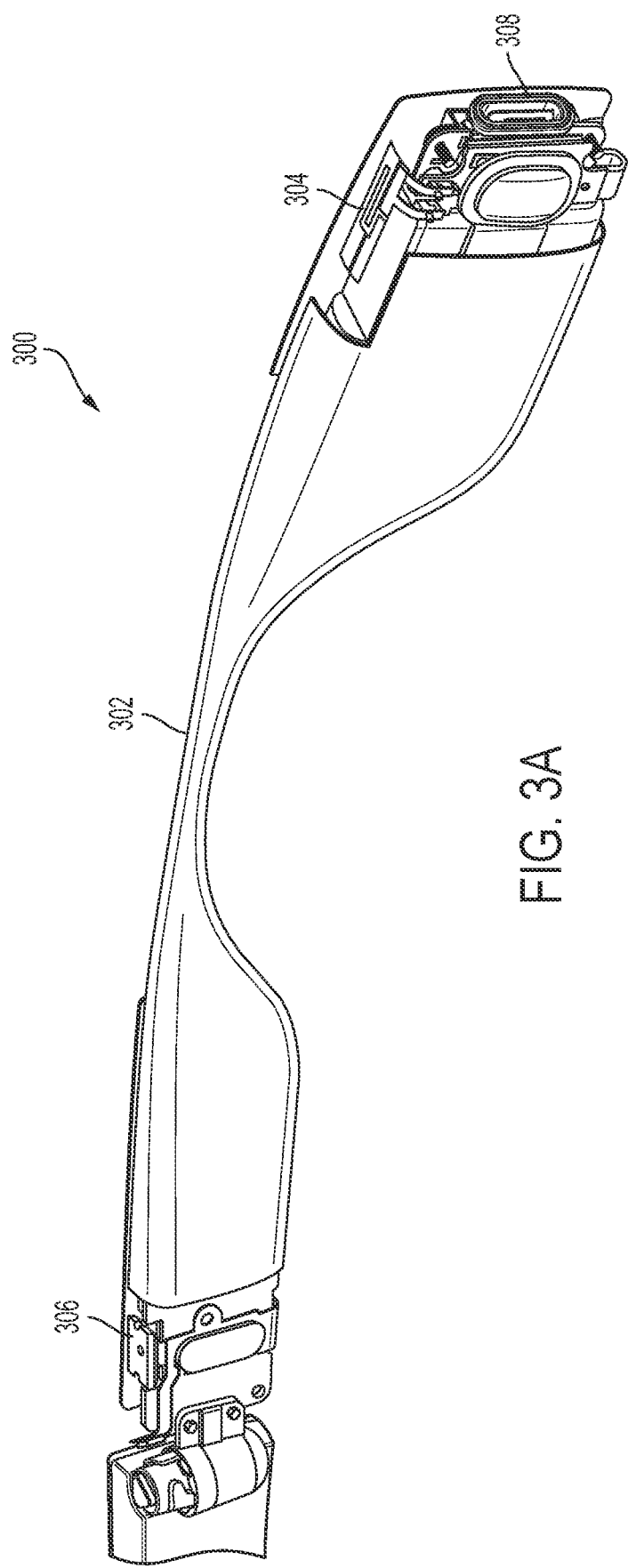

FIG. 3A shows one example arrangement 300 of a wearable apparatus 302 having antennas 304, 306 and a data port 308. As previously discussed, the wearable apparatus 302 may be a head-mountable device. The portion of the apparatus 302 shown in FIG. 3A may be a side-arm of a glasses-like headset. The apparatus 302 may have a portion that rests on a wearer's ears. The apparatus 302 may be configured for wireless communication. In some examples, antenna 304 may be a dual-band antenna that can communicate Wi-Fi signals (e.g., signals based on the 802.11 family of protocols) between the apparatus 302 and a wireless base station. The dual-band antenna may be configured to operate in both the 2.4 GHz and 5 GHz bands. In some examples, the present antennas may be either a flex antenna or a Laser Direct Structuring (LDS) manufactured antenna.

Further, the apparatus 302 may include an antenna 306 that enables Global Positioning System (GPS) functionality. In some examples, antenna 304 and antenna 306 may be located on opposite ends of the side-arm of the apparatus 302. However, in other examples, both antenna 304 and antenna 306 may be located at one end of the side-arm of the apparatus 302.

Further, the apparatus 302 may include a data port 308. The data port may be a USB port, such as a USB-C port, that enables the apparatus to be coupled to a computer or other device.

In the various iterations of the Figures, different styles of antenna 310 may be shown. Within the context of the present disclosure, the antenna 310 may have different shapes depending on various configurations. This disclosure is not meant to be limited to a single shape for antenna 310. Additionally, all of the antennas may be coupled to respective radio hardware that is not pictured. For example, antenna 304 may be coupled to a Wi-Fi chipset and antenna 306 may be coupled to a GPS chipset.

Figure 3C:
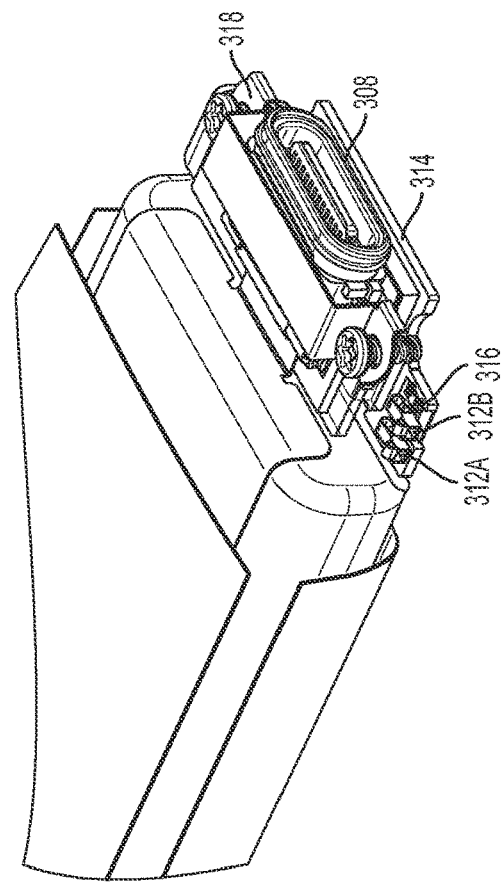
Figure 3B:
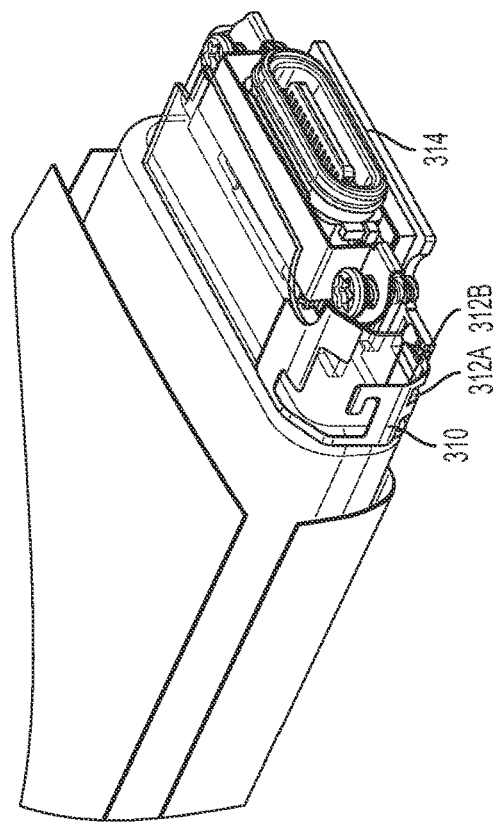

FIG. 3B shows an example antenna 310 in more detail. The antenna 310 may be coupled by way of spring clips (or c clips) 312A and 312B to the printed circuit board 314. The spring clips 312A and 312B provide electrical contacts from the antenna to various components on the PCB. In some examples, one spring clip may be an antenna feed, while the other spring clip connects the antenna 310 to a ground layer of the PCB. The PCB 314 may also include radio controller chips that enable the Wi-Fi communication of the antenna.

Although this description uses the term spring clips, other types of connections are possible too. The connection may be made in a way that the antenna 310 does not need to be mechanically coupled to the clips (or other connection) until the device is assembled (described further with respect to FIG. 3E below).

FIG. 3C details similar structures to FIG. 3B, but having the antenna 310 removed. The spring clips 312A and 312B may be mounted on the PCB 314. On the PCB 314 may be some antenna matching components 316. The antenna matching components 316 are configured to provide an approximate impedance match between the antenna 310 and the pair of spring clips 312A and 312B.

Additionally, the area around the data port 308 may include some shielding 318 location between the data port and the antenna. In some examples, the shielding 318 may be made of either graphite or metal. The shielding 318 may function to help isolate the antenna 310 from the metal portion of the data port 308. By shielding the antenna, the antenna radiating performance may be improved.

Figure 3D:
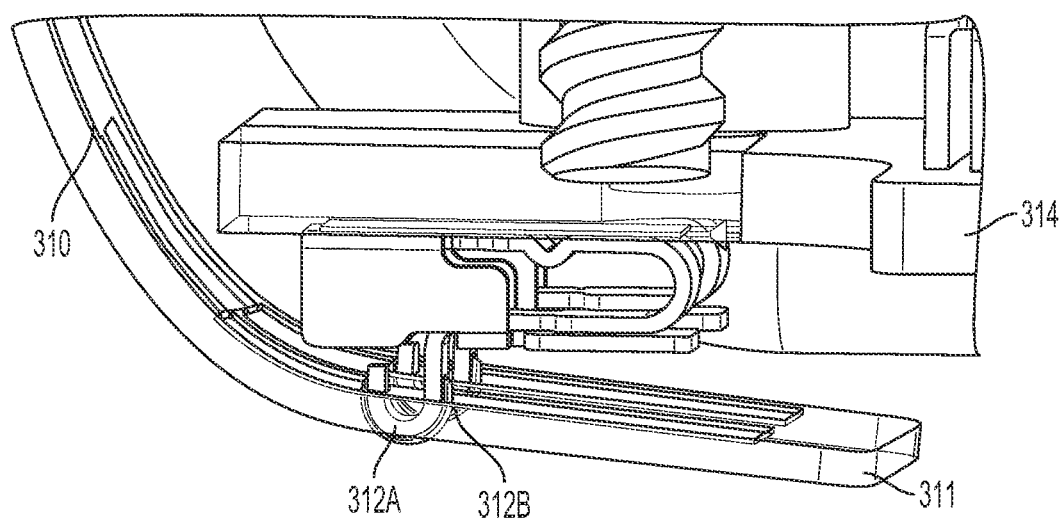

FIG. 3D presents another view of the antenna 310 coupled to the pair of spring clips 312A and 312B mounted on a PCB 314. The antenna 310 may be mounted on its own flexible PCB or substrate 311. As shown in FIG. 3D, the antenna 310 may have two recessed portions in which in the spring clips 312A and 312B fit into to provide a connection to the antenna 310.

Figure 3E:
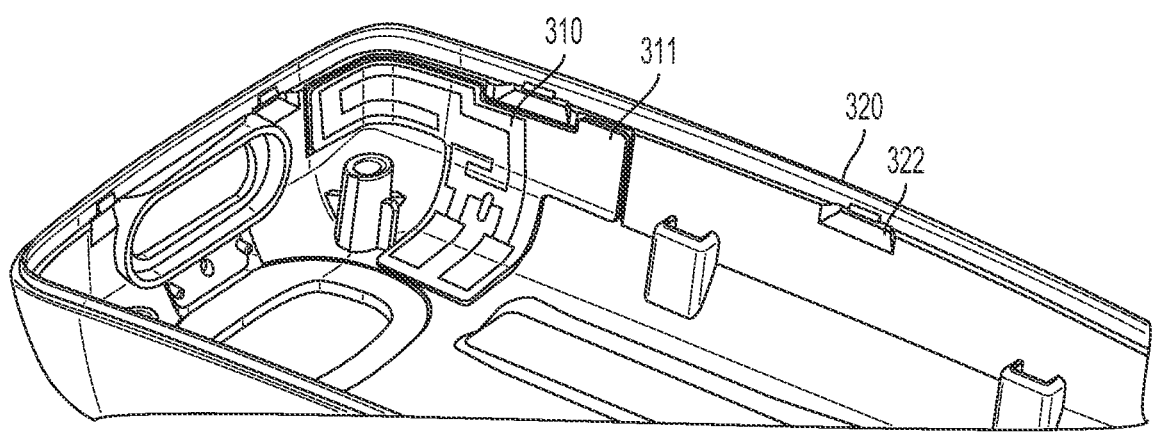

FIG. 3E shows a cap portion 320 that may couple to the side-arm assembly 302. In some examples, the antenna 310 and antenna PCB 311 may be coupled to the inside of the cap portion 320. When the apparatus is built, the cap 320 may be connected to the side-arm assembly 302. When the cap 320 is put into place, the antenna 310 may come in contact with the pair of spring clips 312A and 312B mounted on a PCB 314.

By building the antenna 310 into the cap portion 320, the antenna 310 may be spaced further away from the other components mounted on the PCB 314. By keeping the antenna 310 further away from the other PCB 314 components the antenna 310 may have more desirable radiating properties. In some examples, the cap 320 may be made of a plastic through an injection molding process. The cap 320 may also include at least one clip 322 configured to securely connect the cap 320 to the side-arm assembly 302.

Figure 3F:
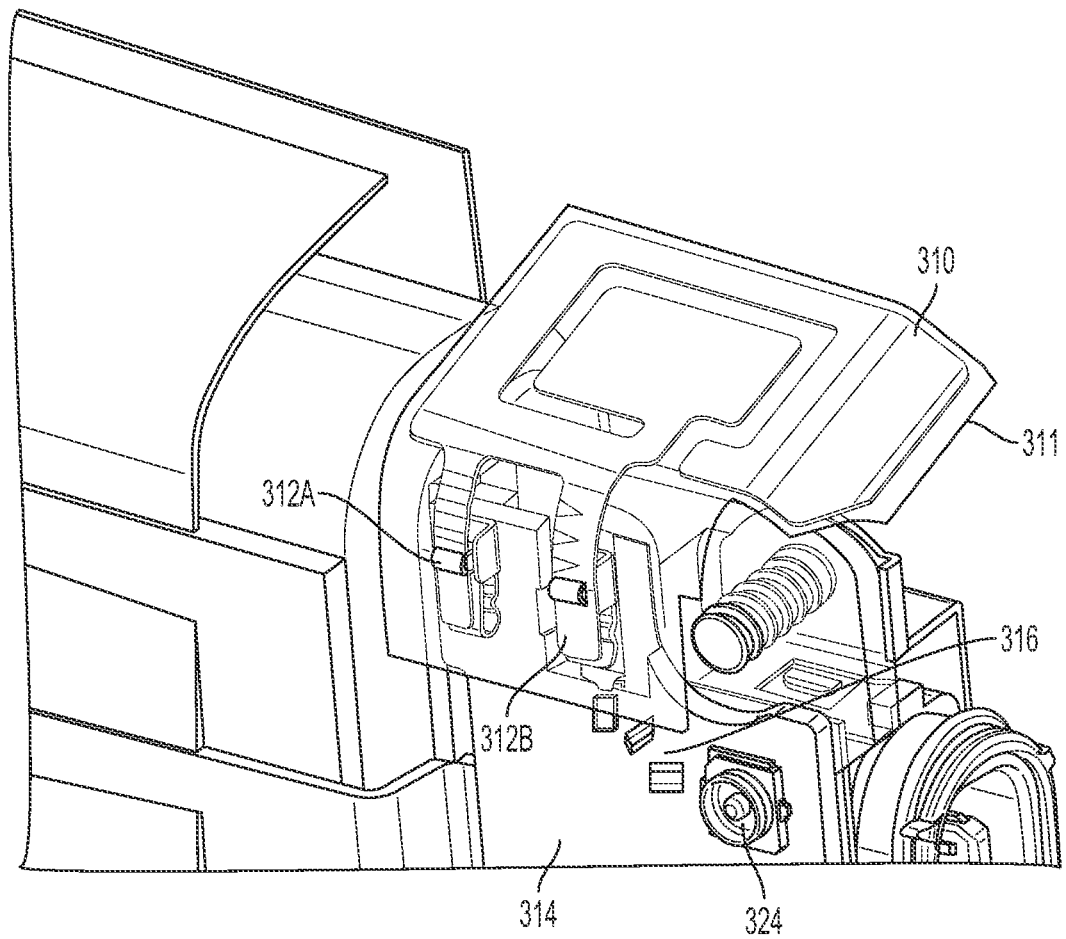

FIG. 3F details another view of the antenna 310. In this example, the cap 320 (described with respect to FIG. 3E) has been omitted so the components are easier to see. FIG. 3F shows the system with the antenna 310 coupled to spring clips 312A and 312B mounted on the PCB 314. Additionally, the PCB 314 includes some antenna matching components 316. Further, the PCB 314 include an RF port 324. The RF port 324 may enable the device to be coupled to radio test equipment to determine the Wi-Fi performance of the system when the antenna 310 is not connected. The RF port 324 may be used in a diagnostic mode to adjust Wi-Fi power levels or other parameters.

Figure 3H:
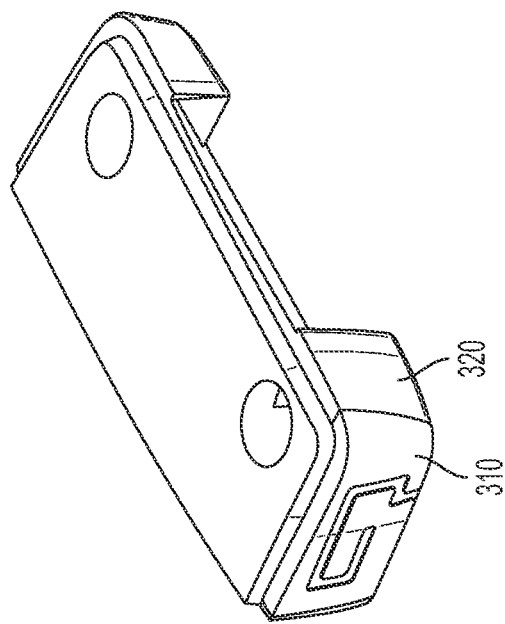
Figure 3G:
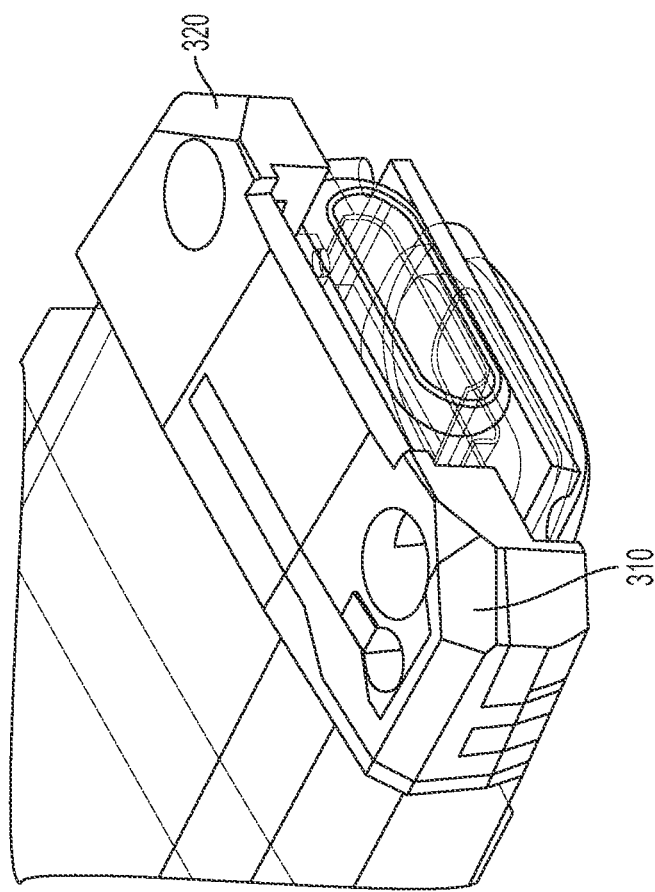
Figure 31:
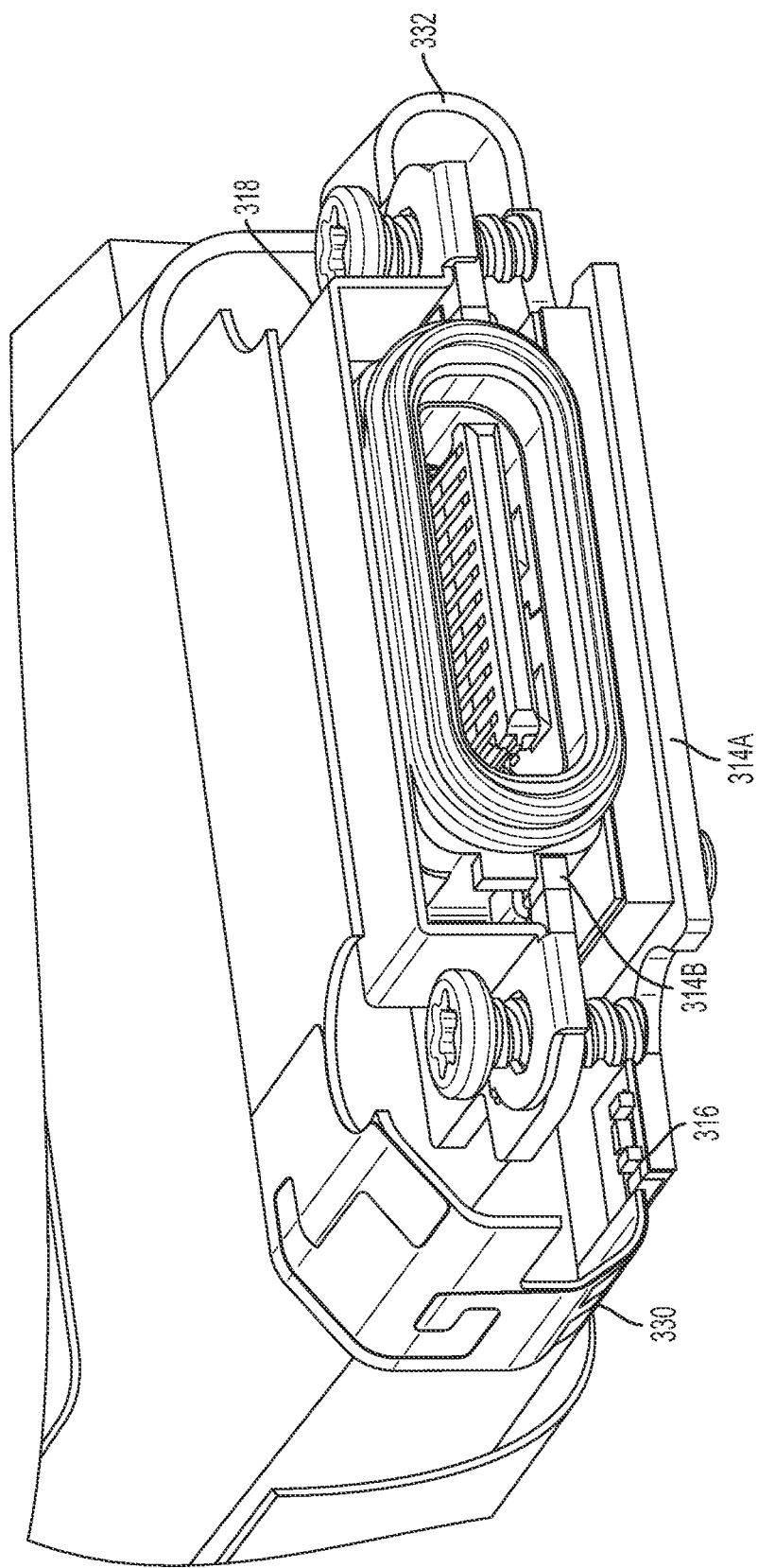

Additionally, as discussed previously, antenna 310 of FIG. 3F shows a different shape antenna that some of the other Figures. Because the antenna shape can be highly dependent on the various structures around the antenna 310, the shape of the antenna may vary significantly based on other changes in the system as a whole. Similarly, FIGS. 3G and 3H present other possible shapes for antenna 310 mounted to a cap 320.

Shown in FIG. 3I is a different example antenna 330 setup. As shown in FIG. 3I, the antenna 330 may be directly coupled to the PCB 314A. In some examples, antenna 330 may be on a rigid flex. In other examples, antenna 330 may be on a bent portion of PCB 314A. Also located on PCB 314A are some antenna matching components 316.

In the example shown in FIG. 3I, there may be a second PCB portion 314B. The second PCB portion 314B may have the data port 308 coupled to it. Additionally, a grounding layer of PCB 314A may be coupled to the grounding layer of the second PCB portion 314B by a grounding connector 332. Additionally shown in FIG. 3I is a shielding 318 around the data port 308.

The configurations shown in FIGS. 3A-3I are meant to disclosure various features of the present system. Various aspects disclosed in one of FIGS. 3A-3I may be combined with aspects of the other Figures within the scope of the present disclosure.

IV. METHODS USING WI-FI RTT AND IMU

As noted above, a wearable device such as an HMD, may implement Wi-Fi Round Trip Time (RTT) functionality for location determination. Wi-Fi RTT functionality is built on the IEEE 802.11mc protocol. By implementing Wi-Fi RTT functionality, a device can determine respective distances to other supporting devices, including Wi-Fi access points (APs) and/or peer devices (that support a Wi-Fi Aware feature), such other wearable devices, mobile phones, laptops, etc.

Notably, Wi-Fi RTT allows for indoor location determination (and can also be utilized in outdoor environments), and is typically accurate within 1 to 2 meters. To do so, a device uses Wi-Fi RTT to measure the distance to three or more access points and/or Wi-Fi Aware peer devices. The device can then utilize a trilaterion or multilateration algorithm to calculate its location. More specifically, the HMD may utilize Wi-Fi RTT and/or the related Fine-Time-Measurement (FTM) capabilities specified by the IEEE 802.11mc standard to precisely calculate respective distances between the HMD and three or more other devices by measuring the time a packet takes to make a round trip between the HMD and each of the other devices, and multiplying these times by the speed of light.

In some embodiments, a Wi-Fi RTT chipset and antenna could be utilized in conjunction with an IMU to provide various functions. Advantageously, the use of Wi-Fi RTT may allow these functions to be performed indoors (where GPS may be unavailable) and outdoors. For example, an HMD could determine its location (e.g., XY or XYZ coordinates in a space) using Wi-Fi RTT, and could also determine its orientation or pose using the IMU. Provided with its location and pose, the HMD can then determine the relative position of an object or objects in its environment.

Figure 4:
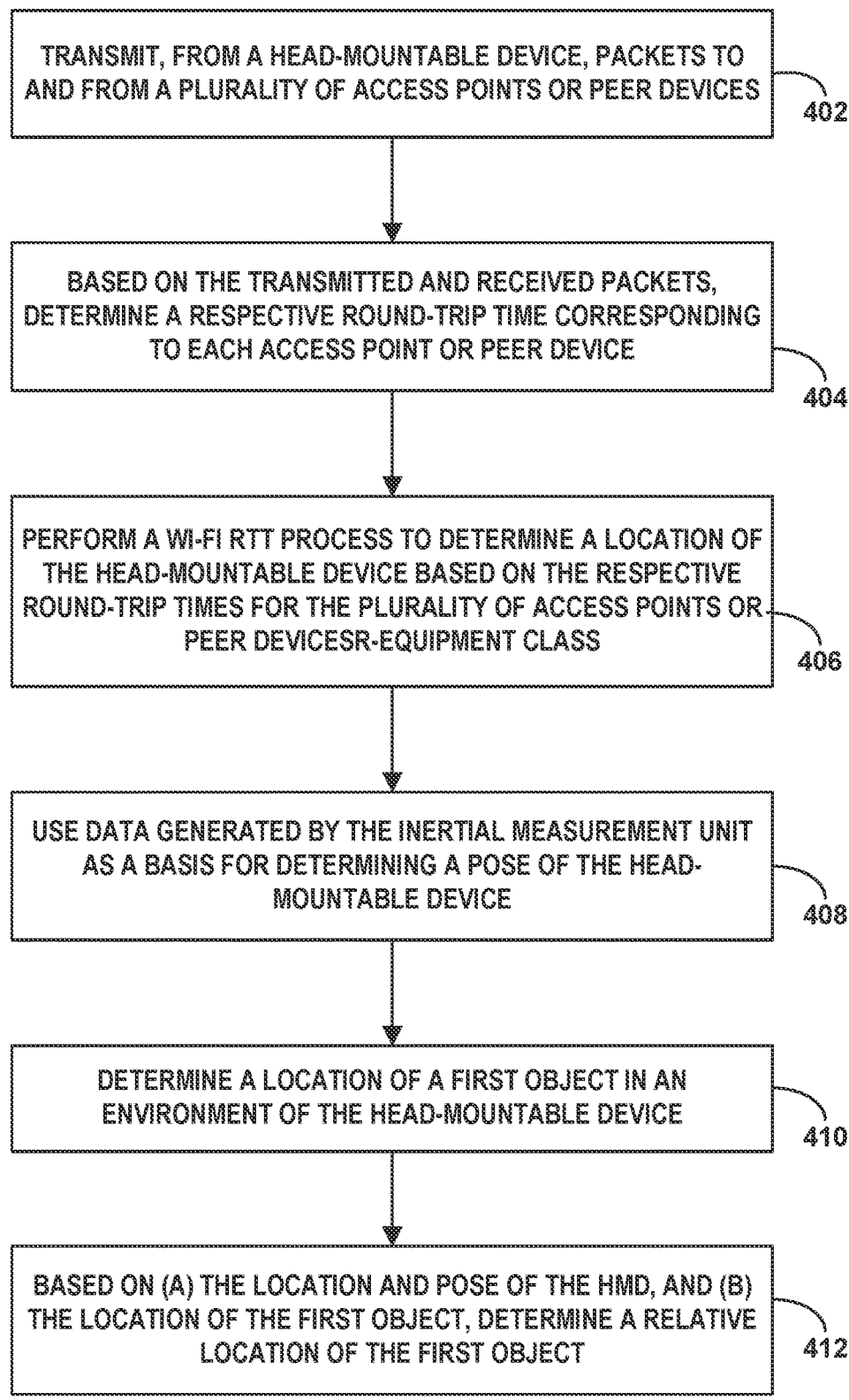
FIG. 4 shows a method, according to example embodiments.

More specifically, FIG. 4 is a flow chart illustrating a method 400 according to an example embodiment. For ease of explanation, method 400 is described by way of example as being performed by an HMD having a Wi-Fi chipset and an IMU. However, method 400 may be performed by other types of wearable devices, without departing from the scope of the invention.

As shown by block 402, method 400 involves an HMD transmitting packets to and from a plurality of access points or peer devices. Then, based on the transmitted and received packets, the HMD determines a respective round-trip time corresponding to each access point or peer device, as shown by block 404. The HMD then uses a Wi-Fi RTT process to determine its own location, based on the respective round-trip times for the plurality of access points or peer devices, as shown by block 406. In addition, the HMD uses data generated by its IMU as a basis for determining a pose of the head-mountable device, as shown by block 408. The HMD also determines a location of a first object in its environment, as shown by block 410. Then, based on the combination of the HMD's location, the HMD's pose, and the location of the first object, the HMD can determine a relative location of the first object, as shown by block 412.

For example, using Wi-Fi RTT location determination and IMU-based posed determination, an HMD could perform method 400 to determine that an object is "in front of" or "behind" the HMD wearer. To do so, the HMD may determine its own location, and the location of an object in the environment. As such, the HMD is now capable of determining the object's location relative to the HMD. The HMD may then determine the wearer's pose (e.g., the direction the wearer's head is oriented) based on the assumption that the HMD will be worn in a certain way, such that the wearer's head will have a certain alignment with respect to the HMD. Accordingly, the pose of the HMD may be used to determine the pose of the wearer's head. Once the pose of the wearer's head is determined, the HMD can determine a relative position of the object in the environment (e.g., to the left or right of the wearer, behind the wearer, etc).

At block 410, the location of an object in an HMD's environment could be determined in various ways. For instance, to determine the location of another device could simply send its location (directly or indirectly) to the HMD. Alternatively, the HMD could detect the object by analyzing image data of the environment, and determine the object's location using various computer vision techniques, such as by detecting a fiducial marker associated with an object having a known location. As another option, the HMD could communicate with a server that has been pre-populated with location information for object(s) in the HMD's current environment. Other techniques for determining the locations of objects in the environment surrounding an HMD are also possible.

Advantageously, when Wi-Fi RTT is utilized, the HMD may utilize only one antenna for both Wi-Fi and location determination (as compared to e.g., using a separate GPS antenna or multiple antennas for other angle-of-arrival (AoA) location determination techniques). In a further aspect, when an HMD utilizes Wi-Fi RTT, the HMD can utilize a Wi-Fi access point for location-determination purposes, without actually connecting to that access point. As such, the HMD can determine the distance to the access point without the access point learning the HMD's identity and/or other information related to the HMD. As such, Wi-Fi RTT can help provide for location determine in a more secure manner.

In a further aspect, an HMD could provide other more-advanced functionality based on the ability to determine the relative position of an object in the environment, such using the relative position to interpret or disambiguate voice input (e.g., to select one of multiple signs in response to the phrase "take a photo of this sign"), or augmenting real-world objects in the wearer's field of view with relevant audio and/or visual information (e.g., via the speakers and/or display on the HMD).

In some embodiments, an HMD may utilize a single chipset that provides both Wi-Fi and Bluetooth connectivity. Further, it is contemplated that the method and systems described herein could be implemented in other types of wearable devices, and are not limited to HMDs. Other variations on the methods and device configurations described herein are also possible.

V. CONCLUSION

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

What is claimed:

1. A method comprising:
    transmitting, by a head-mountable device, packets to and from a plurality of access points or peer devices, wherein the head-mountable device comprises a Wi-Fi chipset and an inertial measurement unit;
    based on the transmitted and received packets, determining a respective round-trip time corresponding to each access point or peer device;
    performing a Wi-Fi round trip time (RTT) process to determine a location of the head-mountable device based on the respective round-trip times for the plurality of access points or peer devices;

using data generated by the inertial measurement unit as a basis for determining a pose of the head-mountable device;

determining a location of a first object in an environment of the head-mountable device; and based at least in part on (a) the location and pose of the head mountable device, and (b) the location of the first object, determining a relative location of the first object, wherein determining the relative location of the first object comprises determining that the relative location of the first object is behind a wearer of the head-mountable device.

2. The method according to claim 1, wherein the peer devices support a Wi-Fi Aware feature.

3. The method according to claim 1, wherein performing a Wi-Fi round trip time (RTT) process comprises determining a location of the head-mountable device based on the respective round-trip times for three or more access points or peer devices.

4. The method according to claim 1, further comprising:
determining a location of a second object in the environment of the head-mountable device; and
based at least in part on (a) the location and pose of the head mountable device, and (b) the location of the second object, determining a relative location of the second object, wherein determining a relative location of the second object comprises determining that the relative location of the second object is in front of the wearer of the head-mountable device.

5. The method according to claim 1, wherein determining a location of a first object in an environment of the head-mountable device comprises receiving the location of the first object at the head-mountable device from the first object.

6. The method according to claim 1, wherein determining a location of a first object in an environment of the head-mountable device comprises analyzing image data of the environment.

7. The method according to claim 1, wherein determining a location of a first object in an environment of the head-mountable device comprises receiving the location of the first object at the head-mountable device from a server.

8. The method according to claim 1, further comprising using the relative location of the first object to interpret or disambiguate voice input.

9. The method according to claim 1, further comprising using the relative location of the first object to augment real-world objects in a field of view of a wearer of the head-mountable device.

10. A head-mountable device comprising:
a Wi-Fi chipset operable for wireless data communications;
an inertial measurement unit;
a processor;
a non-transitory computer-readable medium comprising program instructions, which when executed by the processor, cause the processor to:
use the Wi-Fi chipset to transmit and receive packets to a plurality of access points or peer devices;
based on the transmitted and received packets, determine a respective round-trip time corresponding to each access point or peer device;
implement a Wi-Fi round trip time (RTT) process to determine a location of the head-mountable device based on the respective round-trip times for the plurality of access points or peer devices;
based on data generated by the inertial measurement unit, determine a pose of the head-mountable device;
determine a location of a first object in an environment of the head-mountable device; and
based on (a) the location and pose of the head mountable device, and (b) the location of the first object, determine a relative location of the first object, wherein determine the relative location of the first object comprises determining that the relative location of the first object is behind a wearer of the head-mountable device.

11. The head-mountable device according to claim 10, wherein the peer devices support a Wi-Fi Aware feature.

12. The head-mountable device according to claim 10, wherein determine a respective round-trip time corresponding to each access point or peer device comprises determining a location of the head-mountable device based on the respective round-trip times for three or more access points or peer devices.

13. The head-mountable device according to claim 10, wherein the instructions, which when executed by the processor, further cause the processor to:
determine a location of a second object in the environment of the head-mountable device; and
based at least in part on (a) the location and pose of the head mountable device, and (b) the location of the second object, determine a relative location of the second object, wherein determine a relative location of the second object comprises determining that the relative location of the second object is in front of the wearer of the head-mountable device.

14. The head-mountable device according to claim 10, wherein determine a location of a first object in an environment of the head-mountable device comprises receiving the location of the first object at the head-mountable device from the first object.

15. The head-mountable device according to claim 10, wherein determine a location of a first object in an environment of the head-mountable device comprises analyzing image data of the environment.

16. The head-mountable device according to claim 10, wherein determine a location of a first object in an environment of the head-mountable device comprises receiving the location of the first object at the head-mountable device from a server.

17. The head-mountable device according to claim 10, wherein the non-transitory computer-readable medium further comprises program instructions executable by the processor to use the relative location of the first object to interpret or disambiguate voice input.

18. The head-mountable device according to claim 10, wherein the non-transitory computer-readable medium further comprises program instructions executable by the processor to use the relative location of the first object to augment real-world objects in a field of view of a wearer of the head-mountable device.

* * * * *